(12) United States Patent
Zhang

(10) Patent No.: US 10,458,636 B2
(45) Date of Patent: Oct. 29, 2019

(54) BACKLIGHT SOURCE AND CONTROL METHOD THEREOF, A BACKLIGHT MODULE, AND A DISPLAY DEVICE

(71) Applicant: Boe Technology Group Co., Ltd., Beijing (CN)

(72) Inventor: Bo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/577,298

(22) PCT Filed: Jun. 7, 2017

(86) PCT No.: PCT/CN2017/087377
§ 371 (c)(1),
(2) Date: Nov. 27, 2017

(87) PCT Pub. No.: WO2018/028287
PCT Pub. Date: Feb. 15, 2018

(65) Prior Publication Data
US 2019/0017687 A1    Jan. 17, 2019

(30) Foreign Application Priority Data
Aug. 9, 2016    (CN) .......................... 2016 1 0648985

(51) Int. Cl.
*F21V 23/00*    (2015.01)
*F21Y 115/10*    (2016.01)
(Continued)

(52) U.S. Cl.
CPC .......... *F21V 23/003* (2013.01); *F21Y 2107/20* (2016.08); *F21Y 2115/10* (2016.08); *F21Y 2115/15* (2016.08); *F21Y 2115/30* (2016.08)

(58) Field of Classification Search
CPC .......... F21Y 2107/50; G02F 1/133602; G02F 1/133603; G02F 1/133608; G02F 2001/133626
See application file for complete search history.

(56) References Cited

U.S. PATENT DOCUMENTS 6,635,987 B1 *   10/2003   Wojnarowski ...... H01L 25/0753
                                                   257/E25.02
2007/0120109 A1 *  5/2007   Mizuyoshi ........... G02B 6/0021
                                                           257/13
(Continued)

FOREIGN PATENT DOCUMENTS

CN    1501130 A    6/2004
CN    1553261 A    12/2004
(Continued)

OTHER PUBLICATIONS

International Search Report and Written Opinion in PCT/CN2017/087377 dated Sep. 6, 2017, with English translation.
(Continued)

*Primary Examiner* — Zheng Song
(74) *Attorney, Agent, or Firm* — Womble Bond Dickinson (US) LLP

(57) ABSTRACT

The present invention provides a backlight source for use in a display device, comprising: a substrate; a plurality of carriers arranged on the substrate in an array, the carrier comprising a bottom surface in contact with the substrate, a top surface parallel to the substrate and a side surface connected between the top surface and the bottom surface; light emitting elements arranged on the carrier, comprising at least one first light emitting element arranged on the top surface of the carrier for emitting collimated light perpendicular to the substrate, and at least one second light emitting element arranged on the side surface of the carrier for emitting scattered light to a plurality of angles; and a
(Continued)

controller, configured to control at least one first light emitting element to turn on and all second light emitting elements to turn off in response to a first display mode of the display device and to control at last one first light emitting element to turn on and at least one second light emitting element to turn on in response to a second display mode of the display device. The backlight source of the present invention can realize anti-peeping display of the display and switching between the anti-peeping display and normal display.

15 Claims, 2 Drawing Sheets

(51) Int. Cl.
*F21Y 107/20* (2016.01)
*F21Y 115/30* (2016.01)
*F21Y 115/15* (2016.01)

(56) References Cited

U.S. PATENT DOCUMENTS

| | | | | |
|---|---|---|---|---|
| 2007/0253219 | A1* | 11/2007 | Kim | G02F 1/133603 |
| | | | | 362/612 |
| 2007/0279937 | A1* | 12/2007 | Hsiao | G02F 1/133603 |
| | | | | 362/613 |
| 2009/0097248 | A1* | 4/2009 | Tsao | F21V 5/02 |
| | | | | 362/246 |
| 2010/0296266 | A1* | 11/2010 | Dussault | G02F 1/133605 |
| | | | | 362/84 |
| 2011/0193890 | A1 | 8/2011 | Kong | |
| 2013/0271956 | A1* | 10/2013 | Huang | G02F 1/133603 |
| | | | | 362/97.1 |
| 2013/0278865 | A1* | 10/2013 | He | G09F 13/04 |
| | | | | 349/64 |
| 2014/0016340 | A1* | 1/2014 | Cho | F21S 41/141 |
| | | | | 362/516 |
| 2014/0111970 | A1 | 4/2014 | Lu et al. | |
| 2015/0060935 | A1 | 3/2015 | Chang et al. | |
| 2015/0339996 | A1* | 11/2015 | Schuck | G02F 1/133603 |
| | | | | 348/58 |
| 2018/0195684 | A1* | 7/2018 | Vissenberg | B33Y 80/00 |

FOREIGN PATENT DOCUMENTS

| | | |
|---|---|---|
| CN | 1811563 A | 8/2006 |
| CN | 102011981 A | 4/2011 |
| CN | 102155680 A | 8/2011 |
| CN | 103775905 A | 5/2014 |
| CN | 104425679 A | 3/2015 |
| CN | 105911690 A | 8/2016 |
| CN | 106054454 A | 10/2016 |
| JP | 2010145976 A | 7/2010 |

OTHER PUBLICATIONS

Office Action received for Chinese Patent Application No. 201610648985.8, dated Oct. 23, 2018, 18 pages (9 pages of English Translation and 9 pages of Office Action).

* cited by examiner

BACKLIGHT SOURCE AND CONTROL METHOD THEREOF, A BACKLIGHT MODULE, AND A DISPLAY DEVICE

RELATED APPLICATIONS

The present application claims priority of the Chinese patent application numbered 201610648985.8 filed on Aug. 9, 2016, all contents of which are incorporated herein by reference.

FIELD OF THE INVENTION

The present invention relates to the field of display technology, particularly to a backlight source and control method thereof, a backlight module, and a display device.

BACKGROUND OF THE INVENTION

In order to protect trade secrets and individual privacy effectively, more and more display components have been adopting the anti-peeping technology, so that it is at more ease to use computers and mobile phones in working, learning, communication or entertainment.

The existing anti-peeping technology includes glasses-type technology and glassless-type technology. The glasses-type technology performs separation and protection of the confidential information through external auxiliary devices (such as auxiliary glasses), while the glassless-type technology realizes anti-peeping by controlling the angle of the incident light. However, tin the existing anti-peeping technology, there is relative little research on technology capable of realizing switching between anti-peeping display and normal display. Although switching between wide and narrow viewing angles can be realized with director backlight technology, this technology has extremely high requirements on both manufacturing process and quality of the light guide plate and the LED lighting bar, such that ordinary backlight manufacturer can hardly meet the design requirements.

SUMMARY OF THE INVENTION

In view of the defects of the prior art, the present invention provides a backlight source and control method thereof, a backlight module, and a display device, which can realize anti-peeping display and switching between the anti-peeping display and normal display According to a first aspect of the present invention, there is provided a backlight source for use in a display device, comprising: a substrate; a plurality of carriers arranged on the substrate in an array, the carrier comprising a bottom surface in contact with the substrate, a top surface parallel to the substrate and a side surface connected between the top surface and the bottom surface; light emitting elements arranged on the carrier, comprising at least one first light emitting element arranged on the top surface of the carrier for emitting collimated light perpendicular to the substrate and at least one second light emitting element arranged on the side surface of the carrier for emitting scattered light at a plurality of angles; and a controller, configured to control at least one first light emitting element to turn on and all second light emitting elements to turn off in response to a first display mode of the display device, and to control at least one first light emitting element to turn on and at least one second light emitting element to turn on in response to a second display mode of the display device.

In the backlight source according to the first aspect of the present invention, at least one first light emitting element turns on and all second light emitting elements turn off in the first display mode, i.e., a direct light emission mode in which the first light emitting element emits collimated light, and in this mode a viewer must face the display screen directly (or this condition can be relaxed to left and right deviation by a relatively small angle) to see the image clearly, so as to realize the anti-peeping display effect. Whereas, at least one first light emitting element turns on and at least one second light emitting element turns on in the second display mode, i.e., a scattering mode in which the first light emitting element emits collimated light and the second light emitting element emits scattered light, and in this mode the image can be seen clearly as long as the viewer is in front of the display screen (including right ahead or side within the visual range), so as to realize normal display function. In this way, the present invention realizes anti-peeping display of the display and easy switching between the anti-peeping display and normal display by cooperative control of on or off of the light emitting elements at different positions in the backlight source.

In an embodiment of the backlight source according to the present invention, the first display mode can be an anti-peeping display mode, while the second display mode can be a normal display mode.

In an embodiment of the backlight source according to the present invention, a geometrical shape of the carrier can be frustum of a prism or frustum of a cone, and an area of the bottom surface is greater than an area of the top surface, thereby enabling the angle between the side surface and the bottom surface to be less than 90 degrees so as to ensure that the scattered light is emitted upwards to the light exit side.

In an embodiment of the backlight source according to the present invention, the controller can be configured to: control all first light emitting elements to turn on and all second light emitting elements to turn on in the second display mode.

In an embodiment of the backlight source according to the present invention, the controller is further configured to: control first light emitting elements and second light emitting elements arranged on even columns of carriers in the carrier array to turn on and first light emitting elements and second light emitting elements arranged on odd columns of carriers to turn off in response to the second display mode.

In an embodiment of the backlight source according to the present invention, the carrier array comprises several carrier groups constituted by a plurality of columns of carriers, and the controller is configured to control on and off of the first light emitting elements and the second light emitting elements arranged on the carrier according to the carrier groups in response to the second display mode. For example, the carrier group can comprise three columns of carriers arranged successively, and the controller is configured to, in response to the second display mode, control first light emitting elements and second light emitting elements of an intermediate column of carriers of each carrier group to turn on, first light emitting elements of both side columns of carriers and second light emitting elements arranged thereon departing from the intermediate column of carriers to turn on, and second light emitting elements arranged on the side columns of carriers facing towards the intermediate column of carriers to turn off. For another example, the carrier group can comprise two columns of carriers arranged successively, and the controller is configured to, in response to the second display mode, control first light emitting elements of two columns of carriers in each carrier group to turn on, second light emitting elements arranged adjacent to each other on the two columns of carriers to turn off and second light emitting elements arranged thereon departing from each other to turn on.

In an embodiment of the backlight source according to the present invention, the first light emitting element can be a laser light source. Because the laser light source has better collimation, the deviation of the light exit angle can be reduced, thereby ensuring collimation of the emitted light, so as to improve the anti-peeping effect.

In an embodiment of the backlight source according to the present invention, the second light emitting element can be a spherical light source. Because the spherical light source can emit scattered light, it can better ensure the scattering effect of its emitted light. Certainly, the second light emitting element can also be various scattered light sources with low power consumption and high brightness such as LED, MICRO LED, OLED.

In an embodiment of the backlight source according to the present invention, the outer side of the first light emitting element can be provided with a collimator mask, so as to further enable the collimated light emitted by the first light emitting element to have a better light exit collimation, thereby achieving a better anti-peeping effect.

In an embodiment of the backlight source according to the present invention, an angle between a side surface of the carrier on which the second light emitting element is arranged and a bottom surface thereof is less than 90 degrees, so that the scattered light emitted by the second light emitting element is emitted outwards to the light exit side of the backlight source.

In an embodiment of the backlight source according to the present invention, the substrate and the carrier are formed integrally, thereby saving the process steps and process cost effectively.

According to a second aspect of the present invention, a backlight module is provided, comprising any backlight source according to the above embodiments of the present invention.

According to a third aspect of the present invention, a display device is provided, comprising: the backlight module according to an embodiment of the present invention.

According to a fourth aspect of the present invention, a method of controlling a backlight source for use in a display device is provided, wherein the backlight source comprises a substrate; a plurality of carriers arranged on the substrate in an array, the carrier comprising a bottom surface in contact with the substrate, a top surface parallel to the substrate and a side surface connected between the top surface and the bottom surface; light emitting elements arranged on the carrier, comprising at least one first light emitting element arranged on the top surface of the carrier for emitting collimated light perpendicular to the substrate, and at least one second light emitting element arranged on the side surface of the carrier for emitting scattered light to a plurality of angles, and wherein the method comprises: controlling at least one first light emitting element to turn on and all second light emitting elements to turn off in response to a first display mode of the display device; and controlling at last one first light emitting element to turn on and at least one second light emitting element to turn on in response to a second display mode of the display device.

BRIEF DESCRIPTION OF THE DRAWINGS

In order to explain the technical solutions of embodiments of the present invention or the prior art more clearly, next, the drawings to be used in describing the embodiments or the prior art will be introduced briefly. Apparently, the drawings described below only show some embodiments of the present invention. For the ordinary skilled person in the art, other drawings can also be obtained from these drawings on the premise of not paying any inventive efforts.

DETAILED DESCRIPTION OF THE INVENTION

Several embodiments of the technical solutions of the present invention will be described below in detail clearly in conjunction with the drawings of the present invention. Apparently, the described embodiments are only a part of rather than all of the embodiments of the present invention. All other embodiments obtained by the ordinary skilled person in the art based on the embodiments in the present invention on the premise of not paying any inventive efforts belong to the protection scope of the present invention.

Figure 1:
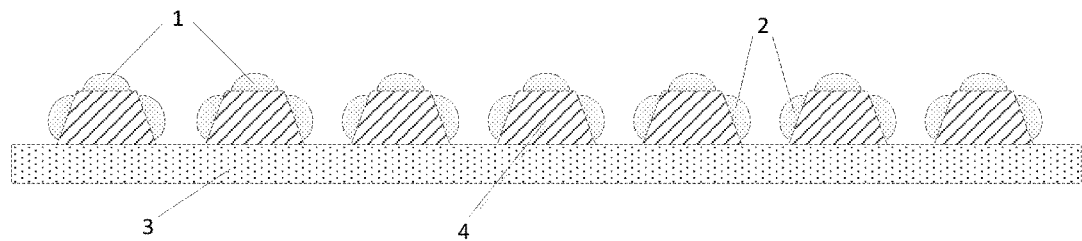
FIG. 1 schematically shows a structural view of a backlight source according to an embodiment of the present invention.

FIG. 1 schematically shows a sectional structural view of a backlight source for use in a display device according to an embodiment of the present invention. As shown in FIG. 1, the backlight source comprises:

a substrate 3;

a plurality of carriers 4 arranged on the substrate 3 in an array, the carrier 4 comprising a bottom surface in contact with the substrate 3, a top surface parallel to the substrate 3 and a side surface connected between the top surface and the bottom surface;

light emitting elements 1 and 2 arranged on the carrier 4, comprising at least one first light emitting element 1 arranged on the top surface of the carrier 4 for emitting collimated light perpendicular to the substrate, and at least one second light emitting element 2 arranged on the side surface of the carrier for emitting scattered light to a plurality of angles.

It needs to be explained that the sectional structural view of FIG. 1 only shows that the second light emitting element 2 is arranged on both of the two opposite side surfaces of each carrier 4, so as to emit scattered light. It can be understood that in fact, other side surfaces of each carrier 4 can also be provided with second light emitting element 2, so as to emit scattered light to more directions.

The backlight source as shown in FIG. 1 can further comprise a controller (not shown in FIG. 1), which can be configured to: control at least one first light emitting element 1 to turn on and all second light emitting elements 2 to turn off in response to a first display mode of the display device; and control at last one first light emitting element 1 to turn on and at least one second light emitting element 2 to turn on in response to a second display mode of the display device. In the backlight source as shown in FIG. 1, the first display mode can be an anti-peeping display mode, while the second display mode can be a normal display mode.

As stated above, in the backlight source as shown in FIG. 1, in the first display mode or the anti-peeping display mode, the controller can be configured to control at least one first light emitting element 1 to turn on and all second light emitting elements 2 to turn off. Because the first light emitting element 1 emits collimated light, the light emitted by the backlight source is collimated light perpendicular to the substrate 3 in the first display mode, so that the viewer must face the display screen directly (i.e., the sight line thereof is perpendicular to the display screen or deviates to the left and right for a relatively small angle, such as 30 degrees or 45 degrees) to see clearly the image, so as to prevent other persons from peeping the image on the display screen from the side, thereby achieving the anti-peeping display effect. It can be understood that in order to increase the display brightness and improve the display effect, the controller can also control all first light emitting elements 1 to turn on in the first display mode.

As stated above, in the backlight source as shown in FIG. 1, in the second display mode or the normal display mode of the display device, the controller can be configured to control at least one first light emitting element 1 to turn on and at least one second light emitting element 2 to turn on. Because the first light emitting element 1 emit collimated light, while the second light emitting element 2 emit scattered light, the emitted light of the backlight source in the second display mode includes light in all directions, so that the image can be seen clearly as long as the viewer is within the general visual range (generally greater than 150 degrees) in front of the display screen (while it is unnecessary to require the viewer to be at right ahead of the display screen or within a relatively small viewing range that meets the anti-peeping display standard, e.g., 60 degrees, i.e., facing the display screen directly or deviating to the left and right by no more than 30 degrees), so as to realize normal display function. In this way, in the embodiment of the present invention, anti-peeping display of the display and switching between the anti-peeping display and normal display are realized through cooperative control of on or off of the first light emitting elements 1 and second light emitting elements 2 at different positions in the backlight source.

It needs to be explained that the slope of the side surface of the carrier 4 and the spacing of the carriers 4 of the backlight source in this embodiment can be adjusted so as to realize different light exit angles, thereby achieving different viewing angles, and finally achieving different levels of anti-peeping effect.

In the backlight source as shown in FIG. 1, an angle between a side surface of the carrier 4 on which the second light emitting element 2 is arranged and a bottom surface thereof is less than 90 degrees. Only in this way, the scattered light emitted by the second light emitting element 2 can be emitted outwards to the light exit side of the backlight source, otherwise, it might be emitted to the substrate 3 so as to be blocked, which cannot play the function of a backlight source.

In the backlight source according to an embodiment of the present invention as shown in FIG. 1, the first light emitting element 1 can be a laser light source. Because the laser light source has better collimation, the light exit angle of the first light emitting element 1 can be reduced, thereby ensuring collimation of the emitted light, so as to improve the anti-peeping effect. Certainly, the first light emitting element 1 can also be other collimating light sources, e.g. various collimating light sources with low power consumption and high brightness such as LED, MICRO LED, OLED etc., which is not limited in the present invention.

In the backlight source according to an embodiment of the present invention as shown in FIG. 1, a collimating mask can also be arranged at the outer side of the first light emitting element 1. In this way, the deviation angle of the emitted light of the first light emitting element 1 can be smaller, so as to achieve better light exit collimation and better anti-peeping effect.

In the backlight source according to an embodiment of the present invention as shown in FIG. 1, the second light emitting element 2 can be a spherical light source. Because the spherical light source can emit scattered light, it can better ensure the scattering effect of the emitted light thereof. Certainly, the second light emitting element 2 can also be various scattering light sources with low power consumption and high brightness such as LED, MICRO LED, OLED, which is not limited in the present invention.

In the backlight source according to an embodiment of the present invention, as shown in FIG. 1, the geometrical shape of the carrier 4 can be a frustum of a prism, the cross section thereof is in a trapezoid shape, and the area of the bottom surface of the frustum of a prism is greater than the area of the top surface, thereby enabling the angle between the side surface and the bottom surface to be less than 90 degrees so as to ensure the scattered light to be emitted upwards to the light exit side. For example, when the carrier 4 is a quadrangular frustum of a prism, it comprises a top surface, a bottom surface and four side surfaces, correspondingly, the bottom surface of the quadrangular frustum of a prism is arranged in contact with the substrate 3, the top surface of the quadrangular frustum of a prism can be provided with the first light emitting element 1, and the four side surfaces of the quadrangular frustum of a prism can be provided with a second light emitting element 2 respectively. In this way, a better light emitting effect can be achieved.

It can be understood that in addition to the frustum of a prism, the carrier 4 can also be a carrier in other shapes, such as frustum of a cone etc., which will not be limited in the present invention.

In the backlight source according to an embodiment of the present invention, the substrate 3 and the carrier 4 can be formed integrally. In this way, the process steps and the process cost can be saved effectively.

In order to explain the technical solutions of the present invention more clearly, the specific implementations of various light emitting modes of the backlight source in the above embodiments will be explained below through several specific embodiments.

Figure 2:
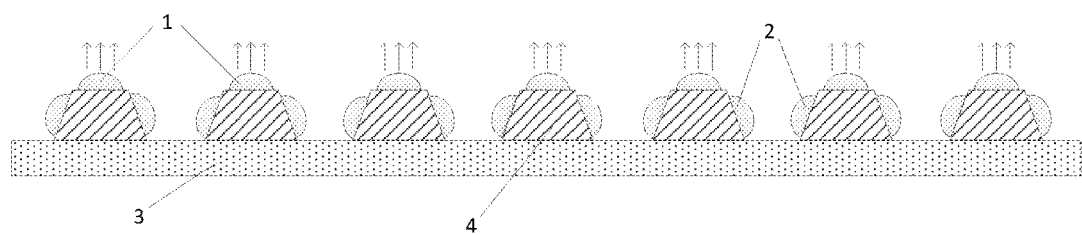
FIG. 2 schematically shows a first light emitting mode of a backlight source according to an embodiment of the present invention.

FIG. 2 schematically shows a first light emitting mode of a backlight source according to an embodiment of the present invention. As shown in FIG. 2, in the first light emitting mode of the backlight source, the controller controls all first light emitting elements 1 to turn on and all second light emitting elements 2 to turn off in response to the first display mode of the display device. Thus, the first light emitting element 1 can only provide a collimating light source perpendicular to the substrate 3, i.e., the light exit side of the backlight source only emits light perpendicular to the light exit surface, and the display angle is within the standard required by the anti-peeping display. Regarding the standard required by the anti-peeping display, it is generally deemed that in order to achieve the anti-peeping effect, the visual area or range of the screen should not be greater than 60 degrees (or it can also be further relaxed to 90 degrees), i.e., the content displayed on the screen can be seen clearly within the range of deviating to the left and right from the normal of the screen for 30 degrees or 45 degrees respectively, while the content displayed on the screen cannot be seen clearly outside this range. Hence, the viewer in front of the display must be within the visual range that meets the anti-peeping display standard, i.e., the sight line thereof is perpendicular to the display screen or deviates to the left and right no more than 30 degrees (or 45 degrees), can be light emitted by the backlight source be received, so as to see the displayed content clearly, thereby achieving the anti-peeping effect.

Figure 3:
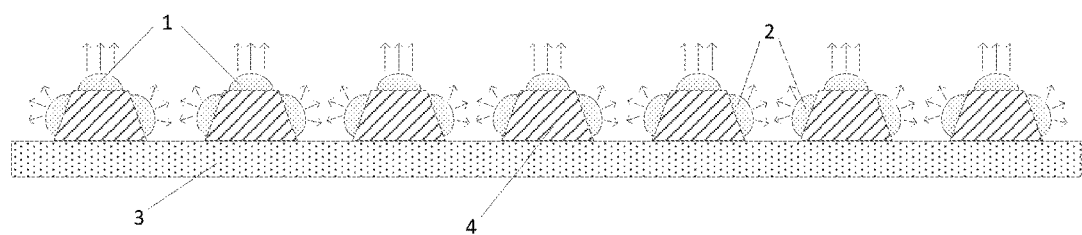
FIG. 3 schematically shows a second light emitting mode of a backlight source according to an embodiment of the present invention.

FIG. 3 schematically shows a second light emitting mode of a backlight source according to an embodiment of the present invention. As shown in FIG. 3, in the second light emitting mode of the backlight source, the controller controls all the first light emitting elements 1 to turn on and all the second light emitting elements 2 to also turn on in response to the first display mode of the display device. Here, the light emitted by the backlight source includes light at all angles, thereby being capable of providing the maximum viewing angle and the highest brightness for the display.

Figure 4:
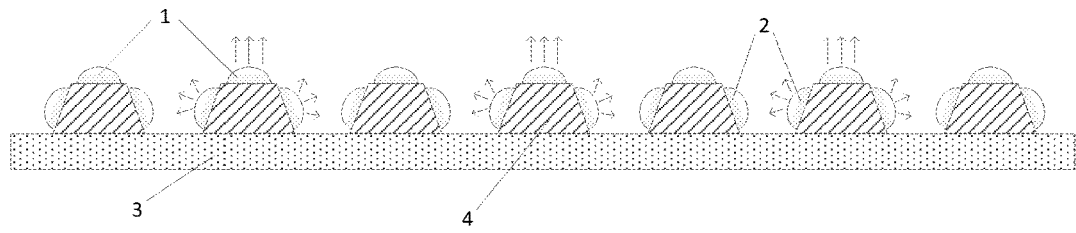
FIG. 4 schematically shows a third light emitting mode of a backlight source according to an embodiment of the present invention.

FIG. 4 schematically shows a third light emitting mode of a backlight source according to an embodiment of the present invention. In the third light emitting mode of the backlight source as shown in FIG. 4, the controller controls the first light emitting elements 1 and the second light emitting elements 2 arranged on the even columns of carriers in the carrier array to turn on and the first light emitting elements 1 and the second light emitting elements 2 arranged on the odd columns of carriers to turn off in response to the second display mode of the display device.

Specifically, as shown in FIG. 4, as a sectional view, each carrier 4 shown in FIG. 4 actually can represent a column of carriers 4 in the carrier array. As shown in FIG. 4, in the third light emitting mode of the backlight source, the first light emitting elements 1 and the second light emitting elements 2 of the second, fourth, sixth columns (even columns) of carriers all turn on, while the first light emitting elements 1 and the second light emitting elements 2 of the first, third, fifth columns (odd columns) of carriers all turn off. In such a third light emitting mode regarding carrier interleaving control, the backlight source can provide a relatively large viewing angle for the display and meanwhile can also save energy consumption effectively.

Figure 5:
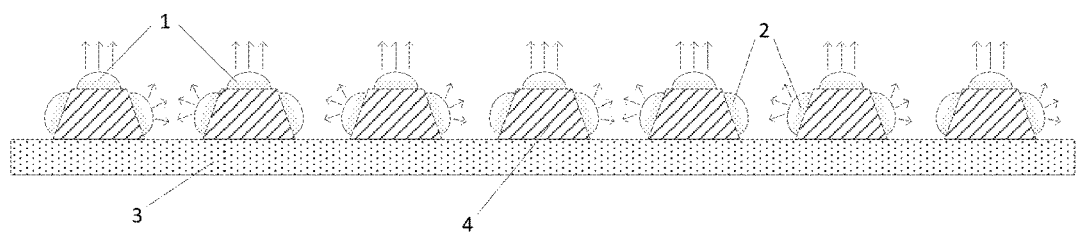
FIG. 5 schematically shows a fourth light emitting mode of a backlight source according to an embodiment of the present invention.
Figure 6:
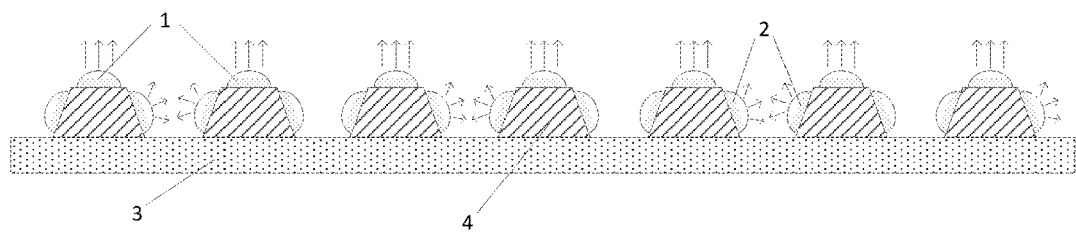
FIG. 6 schematically shows a fifth light emitting mode of a backlight source according to an embodiment of the present invention.

FIG. 5 and FIG. 6 schematically show a fourth and a fifth light emitting modes of a backlight source according to an embodiment of the present invention respectively. In the fourth and fifth light emitting mode, the carrier array can be divided into several carrier groups by columns, each group contains multiple columns of carriers 4, and the controller is configured to control on and off of the first light emitting elements 1 and the second light emitting elements 2 arranged on the carriers 4 by group, thereby improving the display effect of normal display and saving the energy consumption at the same time.

Specifically, in the fourth light emitting mode as shown in FIG. 5, three columns of carriers arranged successively, i.e., the second, third, fourth columns of carriers and the fifth, sixth, seventh columns of carriers constitute two carrier groups respectively, and the controller can be configured to: in response to the second display mode, control the first light emitting elements 1 and the second light emitting elements 2 of the third and the sixth columns of carriers (intermediate column of carriers) of each carrier group to turn on, the first light emitting elements 1 of the second, the fourth and the fifth, the seventh columns of carriers (two side columns of carriers) and the second light emitting elements 2 arranged thereon deviating from the third and the sixth columns of carriers (intermediate column of carriers) to turn on, and the second light emitting elements 2 arranged on the second, fourth and the fifth, seventh columns of carriers (two side columns of carriers) facing towards the third and the sixth columns of carriers (intermediate column of carriers) to turn off. Thus it can be seen that the first light emitting elements 1 of all carriers 4 in this embodiment turn on, while the second light emitting elements 2 at one side of each carrier 4 turn on or the second light emitting elements 2 at multiple sides all turn on. In the fourth light emitting mode as shown, the backlight source saves partial energy consumption in the case of ensuring the viewing angle and the display brightness.

In the fifth light emitting mode as shown in FIG. 6, two columns of carriers arranged successively constitute a carrier group. There are totally three groups in the figure, i.e., the second and the third columns of carriers, the fourth and the fifth columns of carriers and the sixth and the seventh columns of carriers constitute three carrier groups respectively. The controller is configured to: in response to the second display mode, control all the first light emitting elements 1 of each carrier group to turn on, the second light emitting elements 2 arranged adjacent to each other on two columns of carriers in each carrier group to turn off and the second light emitting elements 2 arranged departing from each other to turn on. As shown in FIG. 6, all the first light emitting elements in the three carrier groups (i.e., the second and the third columns of carriers, the fourth and the fifth columns of carriers and the sixth and the seventh columns of carriers), while the second light emitting elements 2 turn on and turn off selectively, i.e., the second light emitting elements 2 arranged close to the side surface turn off and the second light emitting elements 2 arranged departing from the side surface turn on.

Compared to the fourth light emitting mode of the backlight source as shown in FIG. 5, in the fifth light emitting mode of FIG. 6, the first light emitting elements 1 of all carriers 4 turn on, however, only the second light emitting elements 2 at one side of each carrier 4 turn on. Hence, in the fifth light emitting mode, the backlight source saves energy consumption to a greater extent in the case of ensuring the viewing angle and the display brightness.

It can be understood that based on overall consideration of the viewing angle, brightness, and energy consumption of the display, the first light emitting elements and the second light emitting elements in the backlight source in the above embodiments can be selectively controlled to turn on and turn off in a variety of ways so as to meet different application requirements. Hence, the light emitting modes of the backlight source of the present invention are not limited to those defined in the above embodiments.

Based on the same inventive concept, the present invention provides a backlight module, comprising any backlight source according to the embodiments of the present invention. Because the backlight module comprises any backlight source as stated above, it can solve the same technical problem and achieve the same technical effect.

Based on the same inventive concept, the present invention provides a display device, comprising any backlight module as stated above. The display device can be for example (but not limited to): any product or component with the display function such as a liquid crystal display panel, a mobile phone, a panel computer, a television, a laptop, a digital photo frame, a navigator etc. Since the display device comprises any backlight module as stated above, it can solve the same technical problem and achieve the same technical effect.

Figure 7:
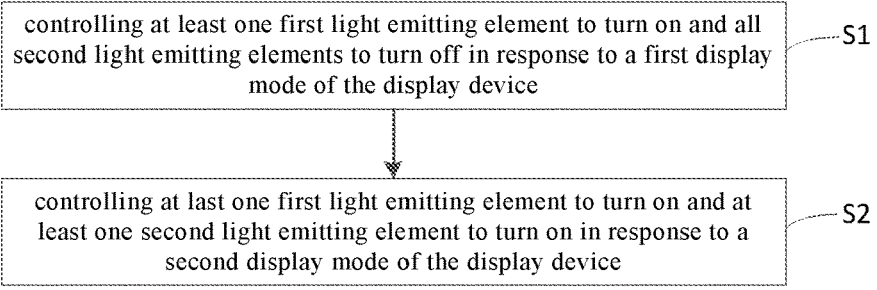
FIG. 7 is a schematic flow chart of a method of controlling a backlight source according to an embodiment of the present invention.

FIG. 7 is a schematic flow chart of a method of controlling a backlight source for use in a display device according to an embodiment of the present invention. The backlight source therein can be the backlight source as shown in FIG. 1, for example, comprising: a substrate 3; a plurality of carriers 4 arranged on the substrate 3 in an array, the carrier 4 comprising a bottom surface in contact with the substrate 3, a top surface parallel to the substrate 3 and a side surface connected between the top surface and the bottom surface; light emitting elements 1 and 2 arranged on the carrier 4, comprising at least one first light emitting element 1 arranged on the top surface of the carrier 4 for emitting collimated light perpendicular to the substrate, and at least one second light emitting element 2 arranged on the side surface of the carrier for emitting scattered light to a plurality of angles.

As shown in FIG. 7, the method comprises the steps of:

S1: controlling at least one first light emitting element to turn on and all second light emitting elements to turn off in response to a first display mode of the display device;

S2: controlling at last one first light emitting element to turn on and at least one second light emitting element to turn on in response to a second display mode of the display device.

The method of controlling the backlight source as shown in FIG. 7 can realize the anti-peeping display effect by controlling at least one first light emitting element 1 to turn on and all second light emitting elements 2 to turn off. Because the first light emitting element 1 emits collimated light, the light emitted by the backlight source in the first display mode is collimated light perpendicular to the substrate 3, so that the viewer must face the display screen directly (i.e., the sight line thereof is perpendicular to the display screen or deviates to the left and right for a relatively small angle, such as 30 degrees or 45 degrees) to see clearly the image, so as to prevent other persons from peeping the image on the display screen from the side, thereby achieving the anti-peeping display effect. On the other hand, the method as shown in FIG. 7 realizes normal display mode by controlling at least one first light emitting element 1 to turn on and at least one second light emitting element 2 to turn on. Because the first light emitting element 1 emits collimated light, while the second light emitting elements 2 emit scattered light, the emitted light of the backlight source in the second display mode includes light towards all directions, so that the image can be seen clearly as long as the viewer is within the general visual range (generally greater than 150 degrees) in front of the display screen (while it is unnecessary to require the viewer to be at right ahead of the display screen or within a relatively small visual range that meets the anti-peeping display standard, e.g., 60 degrees, i.e., facing the display screen directly or deviating to the left and right for no more than 30 degrees), so as to realize normal display function. In this way, the control method of the backlight source as shown in FIG. 7 realizes anti-peeping display of the display and switching between the anti-peeping display and normal display through cooperative control of on or off of the light emitting elements at different positions in the backlight source.

In the description of the present invention, it needs to be explained that the directional or positional relationships indicated by the terms such as "upper", "lower" are directional or positional relationships as shown in the figures, which are only for the convenience of describing the present invention and simplifying the description, rather than indicating or implying that the device or elements as referred to must have particular directions and be constructed and operated in particular directions, hence, they cannot be understood as limitations to the present invention. For the ordinary skilled person in the art, the specific meanings of said terms in the present invention can be understood based on specific conditions.

It has to be further explained that in this text, the relationship terms such as "first" and "second" are only used for distinguishing one entity or operation from another entity or operation, while it is unnecessary to require or imply that such actual relationship or order exists between these entities or operations. Moreover, the terms "comprise", "include" or any other variants thereof intend to cover nonexclusive inclusion, thereby enabling the process, method, article or device including a series of elements to not only include those elements, but also include other elements not listed explicitly, or further include inherent elements of such process, method, article or device. In the case of without more limitations, the element defined by the wording "comprising a (an) . . . " does not exclude presence of another same element in the process, method, article or device that includes the element.

The above embodiments are only used for explaining the technical solutions of the present invention rather than limitations to it. Although the present invention has been explained in detail with reference to the preceding embodiments, the ordinary skilled person in the art should understand that the technical solution recited in each of the preceding embodiments can still be amended, or equivalent replacement can be performed to part of the technical features therein. However, these amendments or replacements do not enable the essence of the corresponding technical solution to break away from the spirit and the scope of the technical solution of each embodiment of the present invention at all.

The invention claimed is:

1. A backlight source for use in a display device, comprising:
   a substrate;
   a plurality of carriers with a shape of a frustum of a prism arranged on the substrate in an array, each said carrier comprising a bottom surface in contact with the substrate, a top surface parallel to the substrate and a plurality of side surfaces connected between the top surface and the bottom surface, wherein an area of the bottom surface is greater than an area of the top surface;
   light emitting elements arranged on: each said carrier, comprising at least one first light emitting element arranged on the top surface of the carrier for emitting collimated light perpendicular to the substrate, and a plurality of second light emitting elements arranged in such a way to arrange at least one said second light emitting element on each of the plurality of side surfaces of the carrier for emitting scattered light to a plurality of angles;
   a controller, configured to control said at least one first light emitting element to turn on and all second light emitting elements to turn off in response to a first display mode of the display device, and to control said at least one first light emitting element to turn on and at least one of said second light emitting elements to turn on in response to a second display mode of the display device.

2. The backlight source according to claim 1, wherein the first display mode is an anti-peeping display mode, while the second display mode is a normal display mode.

3. The backlight source according to claim 1, wherein the controller is further configured to: control all first light emitting elements and all second light emitting elements to turn on in response to the second display mode.

4. The backlight source according to claim 1, wherein the controller is further configured to, in response to the second display mode, control said first light emitting elements and said second light emitting elements arranged on even columns of carriers in the carrier array to turn on and said first light emitting elements and said second light emitting elements arranged on odd columns of carriers to turn off.

5. The backlight source according to claim 1, wherein the carrier array comprises several carrier groups constituted by a plurality of columns of carriers, and the controller is configured to control on and off of the at least one first light emitting element and the second light emitting elements arranged on the carrier according to the carrier groups in response to the second display mode.

6. The backlight source according to claim 5, wherein the carrier group comprises three columns of carriers arranged successively, and the controller is configured to: in response to the second display mode, control said first light emitting elements and said second light emitting elements of an intermediate column of carriers of each carrier group to turn on, said first light emitting elements of two side columns of carriers and said second light emitting elements arranged thereon departing from the intermediate column of carriers to turn on, and said second light emitting elements arranged on the two side columns of carriers facing towards the intermediate column of carriers to turn off.

7. The backlight source according to claim 5, wherein the carrier group comprises two columns of carriers arranged successively, and the controller is configured to: in response to the second display mode, control said first light emitting elements of two columns of carriers in each carrier group to turn on, said second light emitting elements arranged adjacent to each other on the two columns of carriers to turn off, and said second light emitting elements arranged departing from each other to turn on.

8. The backlight source according to claim 1, wherein the at least one first light emitting element is a laser light source.

9. The backlight source according to claim 1, wherein an outer side of the at least one first light emitting element is provided with a collimating mask.

10. The backlight source according to claim 1, wherein each of the plurality of second light emitting element is a spherical light source.

11. The backlight source according to claim 1, wherein an angle between the side surface of the carrier on which the plurality of second light emitting elements are arranged and the bottom surface thereof is less than 90 degrees.

12. The backlight source according to claim 1, wherein the substrate and each of the plurality of carriers are formed integrally.

13. A backlight module, comprising the backlight source according to claim 1.

14. A display device, comprising the backlight module according to claim 13.

15. A method of controlling a backlight source for use in a display device, wherein the backlight source comprises: a substrate; a plurality of carriers with a shape of a frustum of a prism arranged on the substrate in an array, the carrier comprising a bottom surface in contact with the substrate, a top surface parallel to the substrate and a plurality of side surfaces connected between the top surface and the bottom surface, an area of the bottom surface being greater than an area of the top surface; light emitting elements arranged on the carrier, comprising at least one first light emitting element arranged on the top surface of the carrier for emitting collimated light perpendicular to the substrate, and a plurality of second light emitting elements arranged in such a way to arrange at least one of said second light emitting elements on each of the plurality side surfaces of the carrier for emitting scattered light to a plurality of angles; and the method comprises:
controlling said at least one first light emitting element to turn on and all second light emitting elements to turn off in response to a first display mode of the display device; and controlling at last one first light emitting element to turn on and said at least one second light emitting element to turn on in response to a second display mode of the display device.

* * * * *